United States Patent
Wendel et al.

(10) Patent No.: US 11,100,630 B2
(45) Date of Patent: Aug. 24, 2021

(54) METHOD OF DEFECT DETECTION IN PACKAGING CONTAINERS

(71) Applicant: Tetra Laval Holdings & Finance S.A., Pully (CH)

(72) Inventors: Johan Wendel, Genarp (SE); Henrik Forsbäck, Lund (SE); Bengt Ask, Lomma (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/955,305

(22) PCT Filed: Nov. 8, 2018

(86) PCT No.: PCT/EP2018/080661
§ 371 (c)(1),
(2) Date: Jun. 18, 2020

(87) PCT Pub. No.: WO2019/120738
PCT Pub. Date: Jun. 27, 2019

(65) Prior Publication Data
US 2020/0380656 A1    Dec. 3, 2020

(30) Foreign Application Priority Data
Dec. 19, 2017  (EP) .................................. 17208533

(51) Int. Cl.
*G06T 7/00* (2017.01)
(52) U.S. Cl.
CPC .... *G06T 7/001* (2013.01); *G06T 2207/20081* (2013.01); *G06T 2207/30128* (2013.01)
(58) Field of Classification Search
None
See application file for complete search history.

(56) References Cited

U.S. PATENT DOCUMENTS

| | | |
|---|---|---|
| 10,235,749 B2 | 3/2019 | Magana |
| 10,579,035 B2 | 3/2020 | Moruzzi et al. |

(Continued)

FOREIGN PATENT DOCUMENTS

| | | |
|---|---|---|
| CN | 106796678 | 5/2017 |
| CN | 107209932 | 9/2017 |

(Continued)

OTHER PUBLICATIONS

Automated Detection and Rectification of Defects in Fluid-based Packaging using Machine Vision. Keytal et al. (Year: 2019).*

(Continued)

*Primary Examiner* — Delomia L Gilliard
(74) *Attorney, Agent, or Firm* — Knobbe, Martens, Olson & Bear LLP

(57) ABSTRACT

A method of defect detection in packaging containers for liquid food is disclosed, where packaging containers are produced in a machine. The method comprises capturing image data of the packaging containers, defining image features in the image data representing defects in the packaging containers, associating the image features with different categories of defects, inputting the image features to a machine learning-based model for subsequent detection of categories of defects in packaging containers based on the image features, determining time stamps for the occurrence of defects in said subsequent detection, determining associated production parameters of the packaging containers in the machine for the occurrence of defects based on the time stamps, and correlating said occurrence and category of the defects with said production parameters. A system for defect detection in packaging containers is also disclosed.

20 Claims, 4 Drawing Sheets

(56) References Cited

U.S. PATENT DOCUMENTS

| | | | |
|---|---|---|---|
| 2006/0067570 A1* | 3/2006 | Onishi | G06T 7/001 |
| | | | 382/147 |
| 2008/0075352 A1* | 3/2008 | Shibuya | G06K 9/6254 |
| | | | 382/141 |
| 2008/0292178 A1* | 11/2008 | Sones | G06T 7/0004 |
| | | | 382/152 |
| 2009/0060349 A1* | 3/2009 | Linaker | G06K 9/00664 |
| | | | 382/209 |
| 2011/0058160 A1* | 3/2011 | Tan | G01N 21/896 |
| | | | 356/237.2 |
| 2015/0254832 A1* | 9/2015 | Plihal | G06N 20/00 |
| | | | 382/149 |
| 2015/0332445 A1* | 11/2015 | Harada | G01N 21/9501 |
| | | | 382/149 |
| 2018/0300865 A1* | 10/2018 | Weiss | G06T 7/10 |
| 2019/0114804 A1* | 4/2019 | Sundaresan | G06K 9/66 |
| 2019/0130188 A1* | 5/2019 | Zhou | G06K 9/00718 |
| 2020/0034962 A1* | 1/2020 | Mathew | G06K 9/6271 |

FOREIGN PATENT DOCUMENTS

| | | | |
|---|---|---|---|
| EP | 3396632 A1 * | 10/2018 | G06T 11/80 |
| WO | WO 2007/023502 | 3/2007 | |

OTHER PUBLICATIONS

Extended European Search Report dated Jun. 18, 2018 in EP Application No. 17208533.4.
International Search Report and Written Opinion dated Feb. 20, 2019 in International Application No. PCT/EP2018/080661.
Yazdi, Leila, et al., "Feature Extraction Algorithm for Fill Level and Cap Inspection in Bottling Machine," Pattern Analysis and Intelligent Robotics (ICPAIR), 2011 International Conference on, IEEE, Jun. 28, 2011, pp. 47-52.

* cited by examiner

METHOD OF DEFECT DETECTION IN PACKAGING CONTAINERS

TECHNICAL FIELD

The present invention relates to the field of defect detection in packaging containers for liquid food. The present invention relates in particular to a method of defect detection, a related computer program product, a system for defect detection, and a filling machine for producing packaging containers for liquid food, comprising the aforementioned system for defect detection.

BACKGROUND

Defect detection is critical in production lines, such as in the manufacturing of sealed packaging containers for liquid- or semi liquid food in a filling machine or related systems for production of such packaging containers, in order to configure optimal operating settings and ensuring a desired performance over a period of time. Defects in the produced packaging containers may lead to sub-optimal aseptic performance. Hence, it is desirable to develop efficient tools and procedures for identification of faulty behavior of the components in such systems that may result in various types of defects in the produced packaging containers. Since the latest generations of filling machines or related apparatuses employed for the production of sealed packaging containers operate at very high speeds to further increase the throughput of the production line, it has been cumbersome to accurately characterize all aspects of the performance of the package container production without disruption of the production line. This may lead to sub-optimal performance and lowered throughput. A problem is thus how to implement a reliable quality control tool and strategy with a minimum impact on the production while requiring a minimum amount of resources.

It would thus be advantageous with an improved method for defect detection in packaging containers for liquid food, and in particular allowing for avoiding more of the above-mentioned problems and compromises, including providing for a facilitated identification of different categories of defects in a packaging container and method of defect detection having short execution time and thereby enabling analysis on-the-fly without production line disruption.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect a method of defect detection in packaging containers for liquid food is provided, where packaging containers are produced in a machine. The method comprises capturing image data of the packaging containers, defining image features in the image data representing defects in the packaging containers, associating the image features with different categories of defects, inputting the image features to a machine learning-based model for subsequent detection of categories of defects in packaging containers based on the image features, determining time stamps for the occurrence of defects in said subsequent detection, determining associated production parameters of the packaging containers in the machine for the occurrence of defects based on the time stamps, and correlating said occurrence and category of the defects with said production parameters.

According to a second aspect a computer program product comprising instructions which, when the program is executed by a computer, cause the computer to carry out the steps of the method according to the first aspect.

According to a third aspect a system is provided for defect detection in packaging containers for liquid food produced in a machine. The system comprises an imaging device configured to capture image data of the packaging containers, and a processing unit configured to define image features in the image data representing defects in the packaging containers, associate the image features with different categories of defects, input the image features to a machine learning-based model for subsequent detection of categories of defects in packaging containers based on the image features, determine time stamps for the occurrence of defects in said subsequent detection, determine associated production parameters of the packaging containers in the machine for the occurrence of defects based on the time stamps, and correlate said occurrence and category of the defects with said production parameters.

According to a fourth aspect a filling machine comprising a system according to the third aspect is provided.

Further examples of the invention are defined in the dependent claims, wherein features for the second and third aspects of the disclosure are as for the first aspect mutatis mutandis.

Some examples of the disclosure provide for an improved method of detecting defects in packaging containers.

Some examples of the disclosure provide for facilitated identification of different categories of defects in a packaging container.

Some examples of the disclosure provide for facilitated and less time-consuming identification of faulty components or aggregates of components and functionalities in a machine.

Some examples of the disclosure provide for a more efficient use of resources to identify erroneous behavior in a machine.

Some examples of the disclosure provide for a more robust method of defect detection in packaging containers.

Some examples of the disclosure provide for a method of defect detection, having short execution time and thereby enabling analysis on-the-fly.

Some examples of the disclosure provide for a more efficient method of evaluating the quality of a machine.

Some examples of the disclosure provide for less time-consuming trouble-shooting of a machine.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Figure 1:
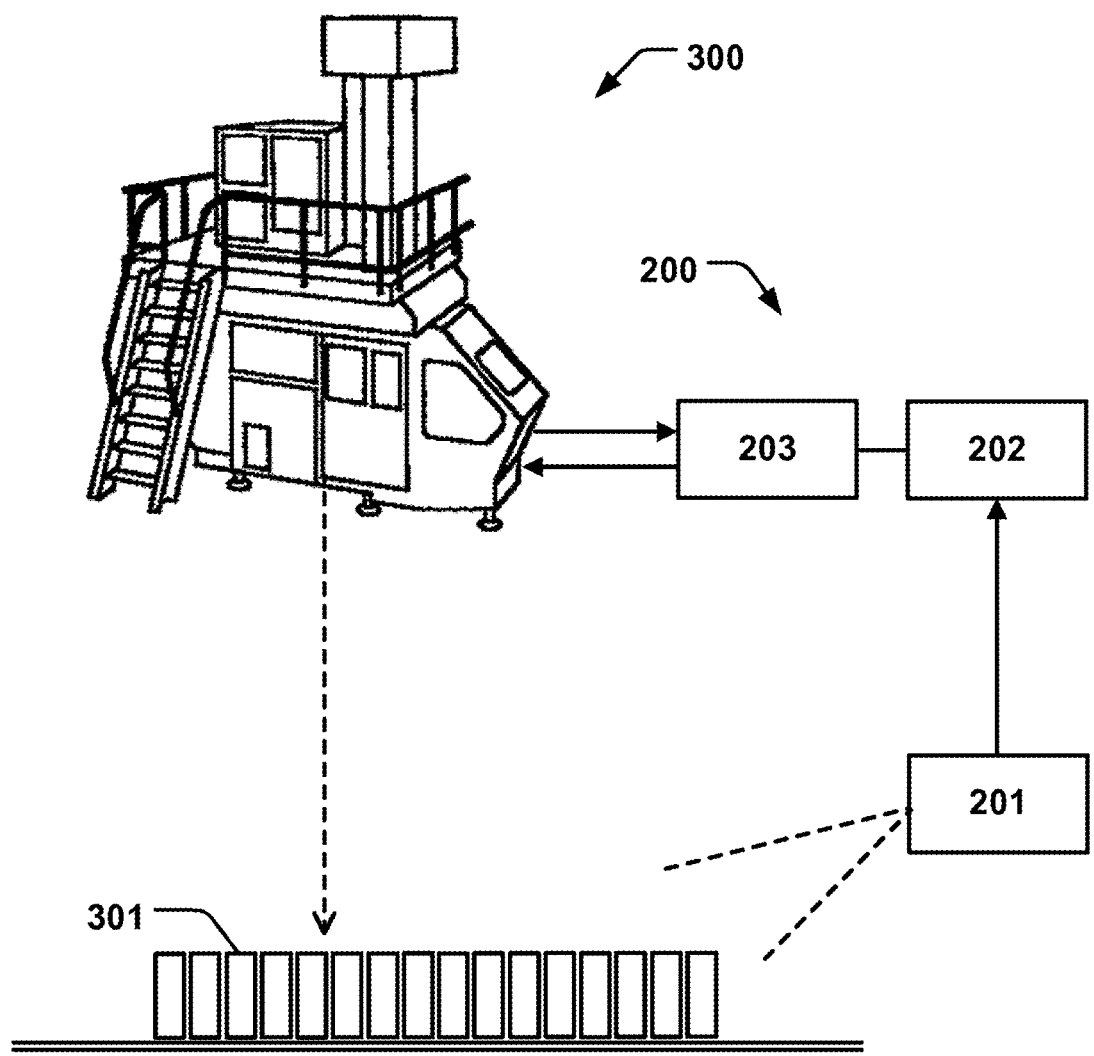
FIG. 1 is a schematic illustration of a system for defect detection in packaging containers, according to examples of the disclosure.

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

FIG. 1 is a schematic illustration of a system 200 for defect detection in packaging containers 301 for liquid- or semi liquid food. The packaging containers 301 are produced in a machine 300 such as in a filling machine 300 sealing the food inside the packaging containers 301. The system 200 comprises an imaging device 201 configured to capture 101 image data of the packaging containers 301. The imaging device 201 may be arranged to capture the image data of the packaging containers 301 when transported along a conveyor, after being sealed in the filling machine 300. It is conceivable however that the imaging device 201 may be arranged along any part of the production line, to capture image data of the containers 301 when at a desired part of the production process. It is also conceivable that a plurality of imaging devices 201 may be arranged to capture the image data from different parts of the production line and/or from different angles in relation to the packaging containers 301, and/or with different exposure settings or image processing parameters. The image data may thus comprise multiple streams of image data captured from such plurality of imaging devices 201. The system 200 comprises a processing unit 202 configured to receive the image data from the imaging device 201. The processing unit 202 is configured to define 102 image features in the image data representing defects 302 in the packaging containers 301. Hence, part of the obtained image data has image features that represent the aforementioned defects, if present in the packaging containers 301. For example, if a packaging container 301 has a defect such as a wrinkle or dent, the captured image thereof may show an associated image feature such as a shadow in the image data at the position of such wrinkle or dent. Different types or categories of defects typically result in different characterizing image features. It is thus possible to define 102 such image features and further have the processing unit 202 configured to associate 103 these image features with different categories of defects. The defects may comprise any of; wrinkles in the material of the packaging containers 301, unsealed flaps of the packaging containers 301, torn or cloudy pre-punched holes in the packaging containers 301, dents in the packaging containers 301, delamination in opening areas of the packaging containers 301. Each of the defects may be associated with the unique image characteristics or features in the captured image data. For example, the image features representing the defects may be uniquely characterized by variations in the image such as color, exposure, contrast etc, as well as from the geometry, dimensions and position of the defects, to create a "finger print" for each of the different defects in the packaging containers 301.

The processing unit 202 is configured to input 104 the unique image features to a machine learning-based model for subsequent detection 105 of categories of defects in packaging containers 301 based on the image features. Thus, the machine learning-based model utilize the defined image features of the defects and provide for subsequent recognition of such defects when new image data is captured of the packaging containers 301 in the production line. The machine learning-based model may be accessed by the processing unit 202 by being implemented locally in the system 200, or by having the processing unit 202 configured to access the machine learning-based model remotely on a server. It is further conceivable that the processing unit 202 itself may be implemented at a server at a remote location and being configured to communicate with the imaging device 202 and the machine 300 from the remote server. The processing unit 202 is configured to determine 106 time stamps, i.e. points in time with reference to a master clock, for the occurrence of defects in the subsequent detection by the machine learning-based model. Thus, the timing of when the defects occurs in the machine 300 may be established. Although a defect may be detected by the imaging device 201 further down the production line it may be possible to back-track the point in time when the defect was inflicted upon the packaging container 301 by tracing the aforementioned package container 301 with reference to a master clock timing the entire production chain. The processing unit 202 is configured to determine 107 associated production parameters of the packaging containers 301 in the machine 300 for the occurrence of defects based on the time stamps. Accordingly, when a defect is detected and the associated time stamp is defined, e.g. by tracing the production process of the packaging container with reference to the master clock, the processing unit 202 is configured to receive data from the machine 300 comprising parameters of the production process at the point in time of the defined time stamp. It is also conceivable that the data comprising the production parameters may be communicated to the processing unit 202 after the detection of a defect by having the aforementioned data indexed with reference to said master clock of the production process, allowing for subsequently determining the associated production parameters for the time stamps defined for the defect detection. The processing unit 202 may thus be configured to communicate with the automation system of the machine 300, via a control unit 203 as schematically illustrated in FIG. 1. The production parameters may comprise any parameter associated with the chain of the production of the packaging containers 301, such as settings and/or sensor data in the machine, and/or properties of the material of the packaging containers 301 or the content to be sealed therein. The processing unit 202 is further configured to correlate 108 the occurrence and category of the defects with the production parameters. By correlating the occurrence and category of the defects with the production parameters it is possible to accurately characterize the origin and circumstances of the formation of any defects in the packaging containers 301. This allows facilitated optimization of the production line and provides for a reliable tool for defect detection. At the same time, by having a system 200 configured as described above, the impact on the throughput of the production line is minimized. A facilitated identification of different categories of defects in a packaging container 301 is provided, while requiring a minimized demand on resources for the process monitoring. Besides from the facilitated and less time-consuming identification of faulty components and functionalities in machine, the system 200 provides for ensuring a further increased quality of the produced packaging containers 301.

Figure 2A:
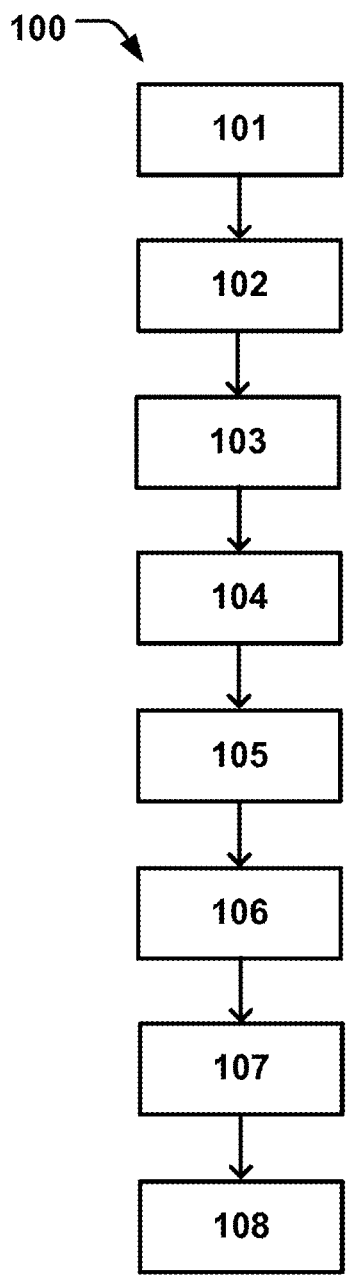
FIG. 2a is a flowchart of a method of defect detection in packaging containers, according to examples of the disclosure.

FIG. 2a illustrates a related flow chart of a method 100 of defect detection in packaging containers 301 for liquid food produced in a machine 300. The order in which the steps of the method 100 are described and illustrated should not be construed as limiting and it is conceivable that the steps can be performed in varying order. The method 100 comprises capturing 101 image data of the packaging containers 301, defining 102 image features in the image data representing defects 302 in the packaging containers 301, associating 103 the image features with different categories of defects, inputting 104 the image features to a machine learning-based model for subsequent detection 105 of categories of defects in packaging containers 301 based on the image features. The method 100 comprises further determining 106 time stamps for the occurrence of defects in said subsequent detection, determining 107 associated production parameters of the packaging containers 301 in the machine 300 for the occurrence of defects based on the time stamps, and correlating 108 said occurrence and category of the defects with said production parameters. The method 100 thus provides for the advantageous benefits as described above in relation to the system 200 and FIG. 1.

Figure 2B:
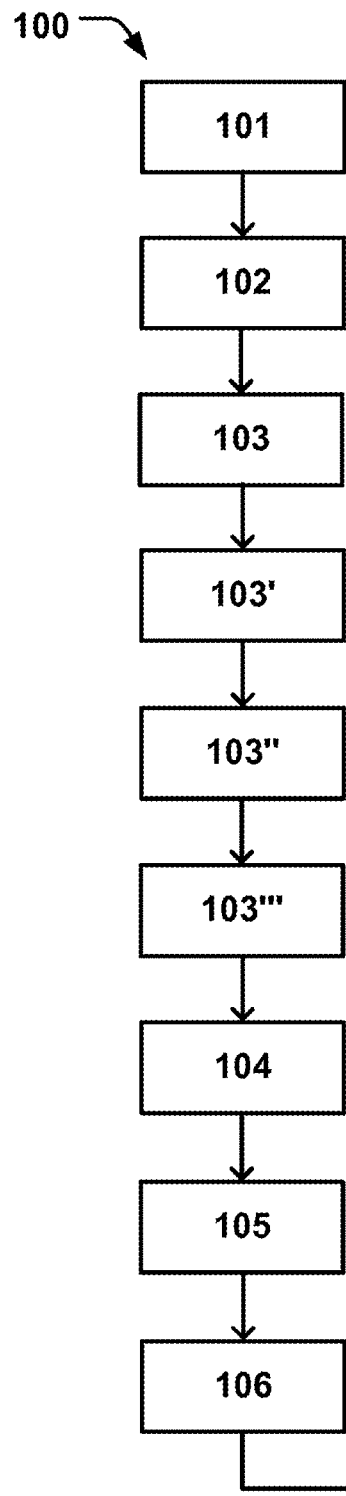
FIG. 2b is another flowchart of a method of defect detection in packaging containers, according to examples of the disclosure.

FIG. 2b illustrates a further flow chart of a method 100 of defect detection in packaging containers 301 for liquid food produced in a machine 300. The order in which the steps of the method 100 are described and illustrated should not be construed as limiting and it is conceivable that the steps can be performed in varying order.

The method 100 may comprise determining 103' a region of interest in the image data based on the category of defects. Thus, a portion of the image data may be chosen for further search and analysis of relevant image features, representing the defects, in the machine learning-based model, depending on the category of the defects. For example, a wrinkle or a dent in the packaging containers 301 may typically occur in a certain part of the image, which may be chosen as the region of interest. This may provide for increasing the speed by which the defects may be detected, which may be particularly advantageous in a filling machine 300 providing a high-speed throughput of the packaging containers. Hence, the method 100 may comprise determining 103" a position and/or a size of the region of interest in the image data based on the category of defects.

The method 100 may comprise selecting a size of the region of interest according to a defined confidence interval of detecting a defect in the image data. I.e. adjusting the size of the region of interest allows for speeding up the detection process while staying within a desired confidence interval and providing a certain probability that a defect is not missed.

The method 100 may comprise processing 103''' the image data in the region of interest according to a set of defined image parameters based on the category of defects. As mentioned, in case the defect is a wrinkle or dent, the image parameters may be optimized to isolate the image features representing these defects more clearly, e.g. by optimizing color balance, exposure, or any image processing filter that emphasize the features for the particular category of defect. The optical components of the imaging device 201 may also be optimized depending on the category of defects, e.g. varying optical filters, lenses, image sensor etc. Accordingly, the processing unit 202 may be configured to process the image data according to a set of defined image parameters based on the category of defects.

The method 100 may comprise communicating 109 control instructions to the machine 300 comprising modified production parameters according to the occurrence and/or category of the defects. The control instructions may thus provide feedback to the machine 300 to modify the production process in dependence on the detected defects. For example, the machine settings may be adjusted so that the occurrence of a particular category of defects can be minimized. Besides from modifying the production parameters depending on if a defect has been detected or not, the processing unit 202 may be configured to modify the production parameters based on for example the size and/or position of a defect in a particular category. Hence, the system 200 may comprise a control unit 203 configured to communicate control instructions to the machine comprising modified production parameters according to the occurrence and/or category of the defects, as schematically illustrated in FIG. 1.

The method 100 may comprise determining 110 a set of alert notifications according to the occurrence and/or category of the defects. A user may thus be notified of various defects and take action in dependence on the alert.

Figure 3A:
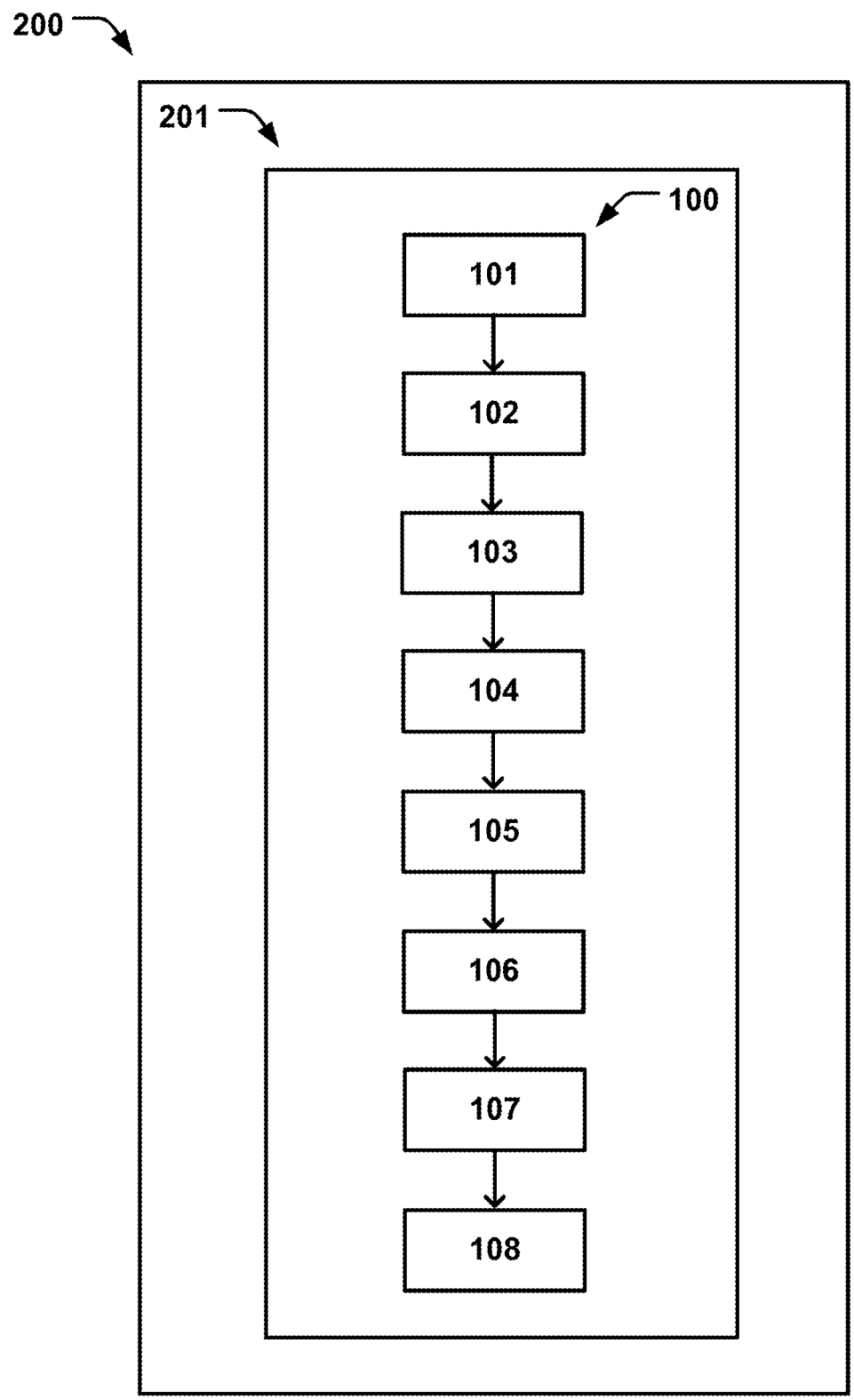
FIGS. 3a-b are schematic illustrations of a system for defect detection in packaging containers executing the method in FIGS. 2a-b, according to examples of the disclosure.
Figure 3B:
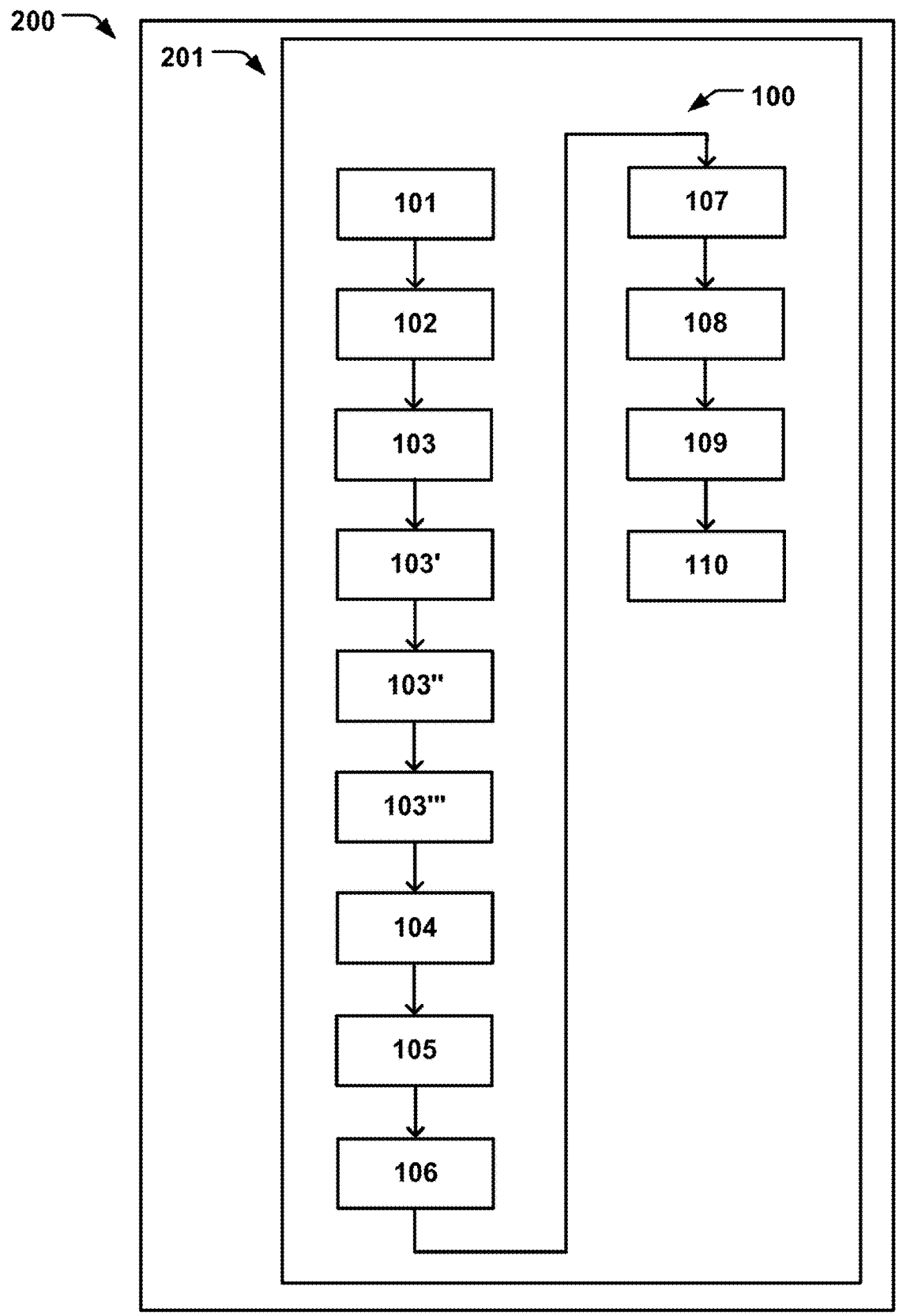

FIGS. 3a-b are schematic illustrations of processor 201 configured to execute the method 100 as described above with respect to FIGS. 2a-b in a filling machine 300.

A computer program product is provided comprising instructions which, when the program is executed by a computer, cause the computer to carry out the steps of the method 100 as described above in relation to FIGS. 1-2.

A filling machine 300 is provided comprising a system 200 as described above in relation to FIG. 1. The filling machine 300 is configured for producing packaging containers for liquid- or semi liquid food. The system 200 comprises an imaging device 201 configured to capture 101 image data of the packaging containers 301 and a processing unit 202 configured to define 102 image features in the image data representing defects 302 in the packaging containers. The processing unit 202 is configured to associate 103 the image features with different categories of defects, inputting 104 the image features to a machine learning-based model for subsequent detection 105 of categories of defects in packaging containers 301 based on the image features, determine 106 time stamps for the occurrence of defects in said subsequent detection, determine 107 associated production parameters of the packaging containers 301 in the filling machine 300 for the occurrence of defects based on the time stamps, and correlate 108 said occurrence and category of the defects with said production parameters. The filling machine 300 thus provides for the advantageous benefits as described above in relation to the system 200 and method 100, and associated FIGS. 1, 2a-b, and 3a-b.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A method of defect detection in packaging containers for liquid food produced in a machine, the method comprising:
   capturing image data of the packaging containers,
   defining image features in the image data representing defects (302) in the packaging containers,
   associating the image features with different categories of defects,
   inputting the image features to a machine learning-based model for subsequent detection of categories of defects in packaging containers based on the image features,
   determining time stamps for the occurrence of defects in said subsequent detection,
   determining associated production parameters of the packaging containers in the machine for the occurrence of defects based on the time stamps, and
   correlating said occurrence and category of the defects with said production parameters.

2. The method according to claim 1, comprising determining a region of interest in the image data based on the category of the defects.

3. The method according to claim 2, comprising determining a position and/or a size of the region of interest in the image data based on the category of the defects.

4. The method according to claim 3, comprising selecting a size of the region of interest according to a defined confidence interval of detecting a defect in the image data.

5. The method according to claim 2, comprising processing the image data in the region of interest according to a set of defined image parameters based on the category of the defects.

6. The method according to claim 1, comprising communicating control instructions to the machine comprising modified production parameters according to the occurrence and/or category of the defects.

7. The method according to claim 1, comprising determining a set of alert notifications according to the occurrence and/or category of the defects.

8. The method according to claim 1, wherein the defects comprise any of: wrinkles in the material of the packaging containers, unsealed flaps of the packaging containers, torn or cloudy pre-punched holes in the packaging containers, dents in the packaging containers, or delamination in opening areas of the packaging containers.

9. A non-transitory storage medium storing instructions which, when executed by a computer, cause the computer to carry out the method according to claim 1.

10. A system for defect detection in packaging containers for liquid food produced in a machine, the system comprising:
   an imaging device configured to capture image data of the packaging containers, and a processing unit configured to:
      define image features in the image data representing defects in the packaging containers,
      associate the image features with different categories of defects,
      input the image features to a machine learning-based model for subsequent detection of categories of defects in packaging containers based on the image features,
      determine time stamps for the occurrence of defects in said subsequent detection,
      determine associated production parameters of the packaging containers in the machine for the occurrence of defects based on the time stamps, and
      correlate said occurrence and category of the defects with said production parameters.

11. The system according to claim 10, wherein the processing unit is configured to process the image data according to a set of defined image parameters based on the category of the defects.

12. The system according to claim 10, comprising a control unit configured to communicate control instructions to the machine comprising modified production parameters according to the occurrence and/or category of the defects.

13. A filling machine comprising the system according to claim 10.

14. A filling machine for producing packaging containers for liquid food, the filling machine comprising a system for defect detection in the packaging containers, wherein the system comprises:
   an imaging device configured to capture image data of the packaging containers, and
   a processing unit configured to:
      define image features in the image data representing defects in the packaging containers,
      associate the image features with different categories of defects,
      inputting the image features to a machine learning-based model for subsequent detection of categories of defects in packaging containers based on the image features,
      determine time stamps for the occurrence of defects in said subsequent detection,
      determine associated production parameters of the packaging containers in the filling machine for the occurrence of defects based on the time stamps, and
      correlate said occurrence and category of the defects with said production parameters.

15. The filling machine according to claim 14, wherein the processing unit is configured to process the image data according to a set of defined image parameters based on the category of defects.

16. The filling machine according to claim 14, comprising a control unit configured to communicate control instructions comprising modified production parameters according to the occurrence and/or category of the defects.

17. The filling machine according to claim 14, wherein the defects comprise any of:
   wrinkles in the material of the packaging containers, unsealed flaps of the packaging containers, torn or cloudy pre-punched holes in the packaging containers, dents in the packaging containers, or delamination in opening areas of the packaging containers.

18. The filling machine according to claim 14, wherein the processing unit is configured to associate the image features with different categories of defects by determining a position and/or a size of a region of interest in the image data based on the category of the defects.

19. The system according to claim 10, wherein the processing unit is configured to associate the image features with different categories of defects by determining a position and/or a size of a region of interest in the image data based on the category of the defects.

20. The system according to claim 10, wherein the defects comprise any of: wrinkles in the material of the packaging containers, unsealed flaps of the packaging containers, torn or cloudy pre-punched holes in the packaging containers, dents in the packaging containers, or delamination in opening areas of the packaging containers.

\* \* \* \* \*